(12) United States Patent
Ashdown

(10) Patent No.: US 10,810,450 B2
(45) Date of Patent: Oct. 20, 2020

(54) METHODS AND SYSTEMS FOR IMPROVED BIOMETRIC IDENTIFICATION

(71) Applicant: BlackBerry Limited, Waterloo (CA)

(72) Inventor: Scott Newman Ashdown, Gloucester (CA)

(73) Assignee: BlackBerry Limited, Waterloo, Ontario (CA)

(*) Notice: Subject to any disclaimer, the term of this patent is extended or adjusted under 35 U.S.C. 154(b) by 127 days.

(21) Appl. No.: 16/130,053

(22) Filed: Sep. 13, 2018

(65) Prior Publication Data
US 2020/0089978 A1   Mar. 19, 2020

(51) Int. Cl.
| | |
|---|---|
| *G06K 9/00* | (2006.01) |
| *G06F 16/29* | (2019.01) |
| *H04W 4/021* | (2018.01) |
| *H04W 12/00* | (2009.01) |
| *H04W 12/06* | (2009.01) |
| *G06F 21/32* | (2013.01) |

(52) U.S. Cl.
CPC ......... *G06K 9/00892* (2013.01); *G06F 16/29* (2019.01); *G06F 21/32* (2013.01); *H04W 4/021* (2013.01)

(58) Field of Classification Search
CPC ... H04W 4/021; G06K 9/00892; G06F 16/29; G06F 21/32
See application file for complete search history.

(56) References Cited

U.S. PATENT DOCUMENTS

| | | | |
|---|---|---|---|
| 8,792,677 B2* | 7/2014 | Kephart | G06K 9/00771 382/103 |
| 9,876,788 B1* | 1/2018 | Ziraknejad | G06F 21/45 |
| 2009/0032587 A1* | 2/2009 | Takanashi | G06F 21/32 235/382 |
| 2011/0084797 A1* | 4/2011 | Narayanan | G06Q 10/06 340/5.51 |
| 2012/0154117 A1 | 6/2012 | Nice et al. | |
| 2012/0250949 A1* | 10/2012 | Abiko | G06T 1/00 382/115 |
| 2013/0051631 A1* | 2/2013 | Hanna | G06K 9/00604 382/117 |
| 2013/0251216 A1 | 9/2013 | Smowton et al. | |
| 2013/0329971 A1* | 12/2013 | Oddou | G06K 9/2018 382/118 |

(Continued)

FOREIGN PATENT DOCUMENTS

EP     2843601 A1    3/2015

OTHER PUBLICATIONS

EPO: EP Extended European Search Report relating to EP application No. 19195742.2, dated Feb. 12, 2020.

*Primary Examiner* — Dominic E Rego
(74) *Attorney, Agent, or Firm* — Rowand LLP

(57) ABSTRACT

Methods and systems for biometric identification. Identification accuracy confidence is improved in one-to-many biometric matching by determining the mobile devices present in the area of the subject-to-be-identified, and determining the set of people associated with the mobile devices. Biometric profiles may be filtered using the set of people determined to be in the location of the subject-to-be-identified based on mobile device presence. The resulting subset provides higher confidence identification if a match is found with a profile belonging to a member of the subset.

22 Claims, 6 Drawing Sheets

(56) References Cited

U.S. PATENT DOCUMENTS

| | | | |
|---|---|---|---|
| 2015/0049922 A1* | 2/2015 | Miller | H04L 63/083 382/118 |
| 2016/0042357 A1 | 2/2016 | Ho | |
| 2017/0132504 A1* | 5/2017 | Kurian | G06K 19/0727 |
| 2017/0351487 A1* | 12/2017 | Aviles-Casco Vaquero | G06F 3/167 |
| 2018/0107332 A1* | 4/2018 | Chan | G06F 3/0416 |
| 2018/0357887 A1* | 12/2018 | Geyer | G08B 21/0297 |
| 2019/0005219 A1* | 1/2019 | Matsuda | H04L 9/0866 |
| 2020/0007333 A1* | 1/2020 | Young | H04L 9/3271 |

\* cited by examiner

METHODS AND SYSTEMS FOR IMPROVED BIOMETRIC IDENTIFICATION

FIELD

The present application generally relates to biometric identification and to methods and systems for improved accuracy in biometric identification.

BACKGROUND

Biometric identification has become commonplace in many electronic systems. Examples include fingerprint scanners, such as are now common in mobile phones, iris scanners, face recognition, voice recognition, etc. In some cases, these are devices to which a user voluntarily and actively submits biometric information. For example, a user may submit a request associated with the biometric information, and the biometric information may be authenticated before the request is granted. An example is fingerprint or facial-recognition based unlocking of a mobile phone. This is akin to entry of a password, in which a user purports to be a particular authorized individual and provides input data to authenticate that claim. This is an example of one-to-one matching in which the input biometric information is compared against one (or very few) templates of the correct data. One-to-one biometric matching tends to be fairly accurate compared to one-to-many matching in which input biometric information is compared against a large database of biometric data so as to identify an individual from among many possible individuals.

One example of one-to-many biometric matching is a user request to enter a secured area at a gate, doorway or other checkpoint, which may involve input of voice information, an iris scan, fingerprint scan, or the like. Consider for example a fingerprint-based entry at a workplace or at a theme park. There may be thousands or tens of thousands of possible matches. In yet other cases, biometric information may be obtained without user participation so as to identify a user. For example, security systems or other monitoring systems may be configured to analyze video or still picture images to detect and obtain facial images and identify the person in the image from among a large database of known persons for whom the system has facial data. Such one-to-many biometric identification system may have a significant False Acceptance Ratio (FAR), which is a measure of how often a particular matching algorithm may incorrectly identify a match.

It would be advantageous to provide for systems and methods of biometric identification that have the potential for more accurate identifications.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
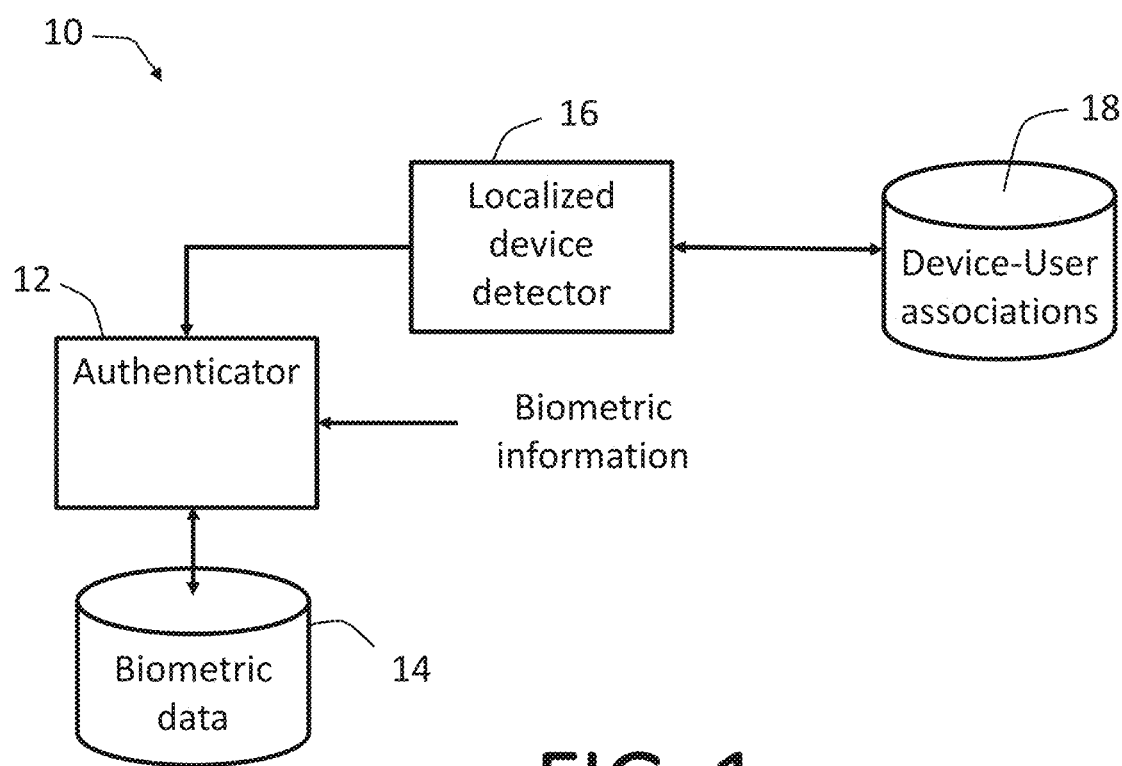
FIG. 1 shows an example system for biometrically identifying a person.

The present application describes methods and systems for improving the quality and confidence of biometric identification.

In one aspect, the present application describes a method of identifying a person located in a defined geographic area using an electronic device, the electronic device including at least one memory unit that includes stored biometric data for a set of people. The method may include obtaining biometric information from the person in the defined geographic area and information related to one or more devices located within the defined geographic area; obtaining, from a stored set of associations between people and devices, one or more identified people based on the information related to one or more devices located within the defined geographic area; reducing the set of people to a subset of people based on the one or more identified people; detecting a sufficient match between the biometric information and the stored biometric data associated with an individual from the subset of people; and outputting a signal identifying said individual as the person.

In another aspect, the present application describes a system for identifying a person located in a defined geographic area. The system includes at least one memory unit that includes stored biometric data for a set of people; and an electronic system having at least one biometric input device to obtain biometric information from the person in the defined geographic area, a communications unit to obtain information related to one or more devices located within the defined geographic area and to obtain, from a stored set of associations between people and devices, one or more identified people based on the information related to one or more devices located within the defined geographic area, and a processor to reduce the set of people to a subset of people based on the one or more identified people, detect a sufficient match between the biometric information and the stored biometric data associated with an individual from the subset of people, and cause output of a signal identifying said individual as the person.

In yet a further aspect, the present application describes non-transitory computer-readable media storing computer-executable program instructions which, when executed, cause one or more processors to perform the described methods.

In yet another aspect, the present application describes a computer-readable signal containing program instructions which, when executed by a computer, cause the computer to perform the described methods.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

In the present application, the term "and/or" is intended to cover all possible combinations and sub-combinations of the listed elements, including any one of the listed elements alone, any sub-combination, or all of the elements, and without necessarily excluding additional elements.

As noted above, biometric identification has become commonplace in many electronic systems. One-to-many matching presents a challenge in achieving an acceptable FAR. Biometric information obtained regarding a subject, which may contain distortions or imperfections in the data, is compared against a large database of pre-stored biometric data, e.g. profiles, so as to try to find a match between the obtained information and one of the pre-stored profiles. Each profile is associated with an individual person and matching obtained biometric information to the profile identifies the subject as that individual person. The quality of the match required to constitute an identification may be tuned depending on the system. A lower quality match will lead to more false positives, whereas a higher quality match may result in few matches and difficultly identifying individuals that have a legitimate profile in the database. Accordingly, it would be advantageous to find mechanisms for improving the confidence and quality of biometric identification.

Reference is now made to FIG. 1, which shows an example of a system 10 that improves biometric identification confidence through the use of side information. In particular, the system 10 may use side information regarding a local population to reduce the set of persons in the database to a subset of persons likely present in the area of the system 10. If a biometric match is found with the biometric data, e.g. profile, of one of the persons in the subset, then it has a higher confidence of being accurate than a match without the side information.

The system 10 includes an authenticator 12 which has access to a memory unit 14, locally or remotely, that stores biometric data for a set of people. The authenticator 12 is an electronic device that includes a processor, memory, communications subsystem(s), and the like. The electronic device further includes at least one biometric input device, locally or remotely, capable of obtaining biometric information from a subject. The biometric information is any data obtained by way of a sensor and representative of a personal characteristic. The biometric information may be an image, video, iris scan, fingerprint scan, voice input, or any other such data.

The electronic device may include a mobile phone, smart phone, tablet, laptop computer, desktop computer, computing kiosk, point-of-sale device, gaming system, headless computer, or any other electronic device capable of carrying out the described operations herein under executable program control.

The system 10 further includes, or has access to, information regarding devices and associated users in a geographic location corresponding to the location of the subject. The devices may be described herein as mobile devices, such as mobile phones, smart phones, tablets, laptops, or the like, but are not necessarily limited to mobile devices. In some cases, the devices may include stationary or fixed computing devices. In this example, the system 10 includes a localized device detector 16. The localized device detector 16 may be a standalone system or part of another system, such as a security system, internal computer network, cellular system, or any other computing system that includes, or has access to, data identifying devices in a geographic area. Such a system may include, for example, a private WiFi network capable of identifying mobile devices or stationary devices attached to the network in the coverage area of the WiFi network. In some cases, a secure device manager is capable of authenticating devices (e.g. using a certificate) and securely running code on the device to obtain device location information, such as GPS data. In another example, it may include local Bluetooth network or other short-range communication system capable of identifying devices attached to the network in its coverage area. In yet another example, it may include a cellular network capable of identifying mobile devices in communication with one or more base stations in the cellular network in the vicinity of an area of interest. In yet further examples, the computing system may include a system that obtains location data from one or more devices in an area. As an example, some facilities may include wireless location systems that may use a combination of WiFi fingerprinting and GPS location reporting to track the location of devices, in particular mobile devices, within a facility. Devices may be also communicate location data through attachment to a wired network port, e.g. Ethernet port, having a known location. In some examples, the computing system may have pre-stored location data for a device having a fixed location, such as a computing kiosk or other such device. Other such systems for identifying devices within a defined geographic area will be appreciated by those of ordinary skill in the art having regard to these examples and the description that follows.

The localized device detector 16 in this example includes a memory 18 containing device-user associations. The device-user associations provide information that associates one or more users (i.e. persons) with each device. In some cases the association is one-to-one. In some cases, a device may be associated with more than one user, or may be associated with a plurality of users belonging to a category or class. The stored set of associations may be a list of device identifiers and, for each device identifier, one or more user identifiers, structured in any suitable data structure.

In some other embodiments, the device-user associations may be stored at the authenticator 12 or in a remote memory to which the authenticator 12 has access.

The localized device detector 16 provides information regarding the devices detected in a defined geographic area associated with the subject. The defined geographic area is an areas associated with the source of biometric information. If the biometric input device supplying information to the authenticator 12 is physically proximate the authenticator 12, then the defined geographic area is proximate the authenticator 12; however, the biometric input device may be remote from the location of the authenticator 12 in some implementations. The defined geographic area may be of a size suitable for a particular implementation and subject to any resolution limitations of the localized device detector 16.

The information regarding devices detected in the area, combined with the device-user associations, provides the authenticator 12 with a set of users likely to be in the defined geographic area. Accordingly, when the authenticator 12 attempts to match the biometric information to stored biometric data, e.g. a biometric profile, it may limit the search to profiles associated with the users identified as likely to be in the defined geographic area, at least initially. In some implementations, the authenticator 12 may first attempt to match the obtained biometric information of the subject to the subset of stored profiles for the users associated with devices detected in the area. Such a match, due to the two sources of identification, provides a higher confidence match that an identification based on biometrics alone. In some implementations, if no match is found then the authenticator 12 may attempt to match the biometric information to one of the other profiles in the set of profiles of stored biometric data. Such a match may have a lower associated confidence since it is not corroborated by identification of an associated device in the area.

It will be appreciated that in some embodiments, not all users in the device-user associations are necessarily represented by a biometric profile in the stored biometric data. That is the persons in the two databases may only partially overlap, such that some individuals in the device-user associations may not have a corresponding biometric profile, and some biometric profiles may not have an associated mobile device. In this sense, the stored biometric data may include a set U of profiles for users $U_1$ to $U_N$. The stored device-user associations may include associations for a set V of users $V_1$ to $V_M$. The detected devices in the area result in a selection of a subset of V. The intersection of V and U produces a subset P of biometric profiles for the persons likely to be in the geographic area.

The user identifier(s) associated with a device may have a prescribed format for uniquely identifying a particular user. In some cases, this may be a name, an email address, an employee number, or some other identifier. Likewise, the biometric profile for a user includes biometric data for the user and some user identifier. In many implementations, the user identifier in the biometric profile and the user identifier in the device-user associations is the same. In some implementations it may not be the same, in which case a further matching operation using a data structure of concordance between user identifiers may be employed to map a user identifier from the device-user associations to one or more user identifiers in the biometric profiles.

Figure 2:
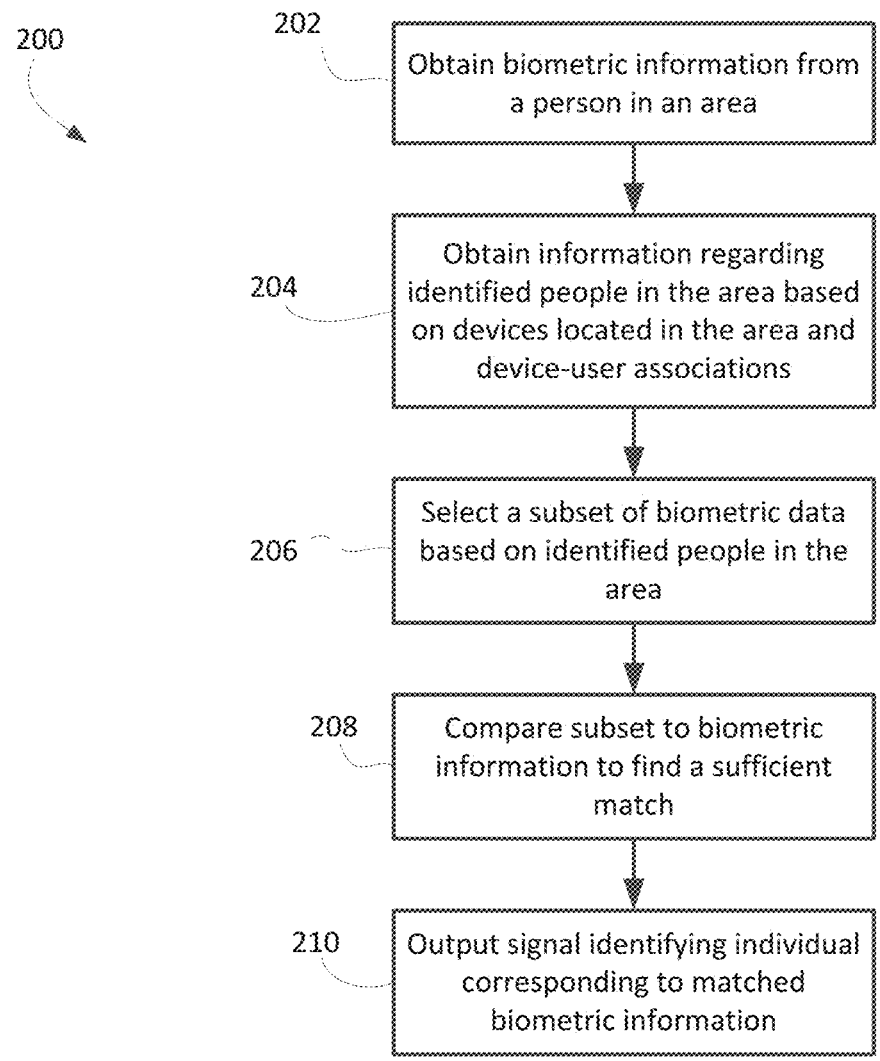
FIG. 2 shows, in flowchart form, a first example method of identifying a person using biometrics.

Reference is now made to FIG. 2, which shows, in flowchart form, one example method 200 of identifying a person located in a defined geographic area using an electronic device. The method 200 includes an operation 202 of obtaining biometric information from a subject person in a defined geographic area. As noted above, the biometric information may be data representative of any person characteristic that may be used to uniquely identify a person. Examples include, but are not limited to, facial features, fingerprints, voice, irises, retinas, vein or palm patterns, DNA, etc. The input device may include a camera, microphone, scanner, capacitive sensors, or any such sensor for obtaining biometric data.

In operation 204, information regarding identified people in the area is obtained. The identified people are people associated with devices located in the area, and the identification of those people may be based on a set of stored associations between each device and one or more users.

A biometric authentication system stores a set of biometric profiles, i.e. biometric data, for a relatively large number of people. This may be stored in the form of a database or any other suitable data structure that enables queries to match biometric information to one or more of the stored profiles. In operation 206, a subset of the stored profiles may be selected based on the information regarding identified people in the area. That is, the subset may be selected to contain the biometric profile of any person identified in operation 204 that has a corresponding biometric profile in the database.

The obtained biometric information is then compared to the profiles in the subset to attempt to identify a sufficient match in operation 208. The determination of whether there is a "sufficient" match may be tuned to a particular application. Various thresholds may be set and/or adjusted for achieving a desired degree of confidence in the accuracy of the identification, and may vary depending on the nature of the biometric data being tested.

When a sufficient match is found to a profile in the subset, a signal is output in operation 210 identifying the individual associated with the matched biometric profile as the subject.

Depending on the implementation and application, the signal may indicate that the subject is permitted access to a system or area, or that the subject has been authenticated for a security purpose, or that a request submitted by the subject is authorized, like a purchase or the like. A separate request handler system may have initiated the biometric authorization process by sending an identification request signal to the authenticator, and the signal returned may indicate success, failure, or the identity of the individual (if identified with sufficient confidence). In some cases, it may indicate whether the identification is high confidence (e.g. one of the profiles in the subset) or low confidence (e.g. one of the profiles but not in the subset), and a low confidence identification may trigger additional authentication or identification operations.

Figure 3:
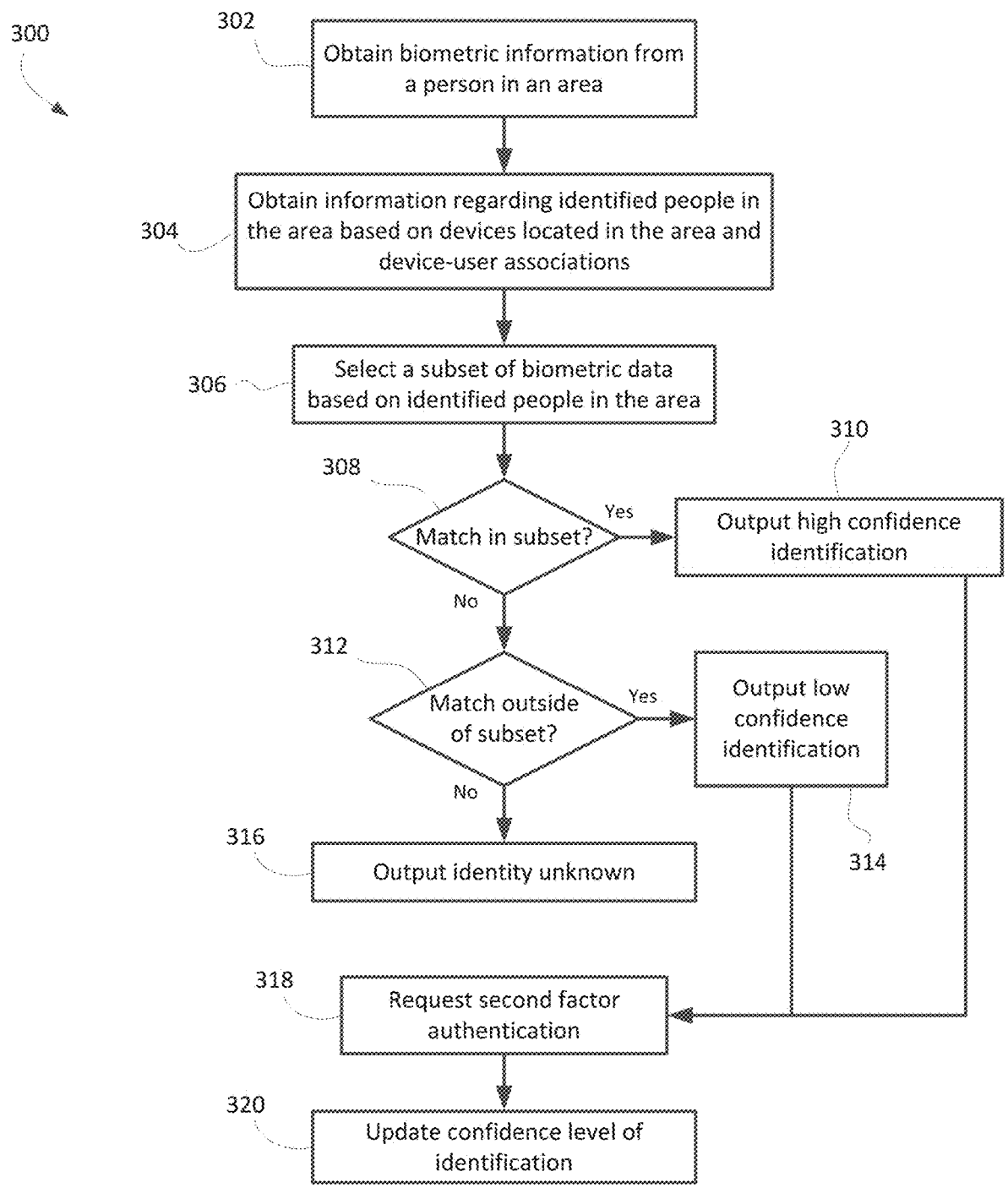
FIG. 3 shows, in flowchart form, a second example method of identifying a person using biometrics.

A further example method 300 of biometrically identifying a subject is shown in FIG. 3. The method 300 includes an operation 302 of obtaining biometric information from a subject person in a defined geographic area. As noted above, the biometric information may be data representative of any person characteristic that may be used to uniquely identify a person. Examples include, but are not limited to, facial features, fingerprints, voice, irises, retinas, vein or palm patterns, DNA, etc. The input device may include a camera, microphone, scanner, capacitive sensors, or any such sensor for obtaining biometric data.

In operation 304, information regarding identified people in the area is obtained. The identified people are people associated with devices located in the area, and the identification of those people may be based on a set of stored associations between each device and one or more users.

A biometric authentication system stores a set of biometric profiles, i.e. biometric data, for a relatively large number of people. This may be stored in the form of a database or any other suitable data structure that enables queries to match biometric information to one or more of the stored profiles. In operation 306, a subset of the stored profiles may be selected based on the information regarding identified people in the area. That is, the subset may be selected to contain the biometric profile of any person identified in operation 304 that has a corresponding biometric profile in the database.

In some examples, before or after operation 306 the system may perform additional filtering (not shown), for example based upon static data, such as whether users are permitted to be in the area under consideration.

In operation 308, the authenticator determines whether a sufficient match is found between the obtained biometric information and one of the profiles in the subset. If so, then it outputs a signal indicating a high confidence match in operation 310. The signal may include the identity associated with the matched profile in some cases. In some other cases, the signal may indicate a class or category of authorized persons to which the identified person belongs, e.g. a security clearance level. In some cases, the signal simply indicates a positive match with high confidence.

If no match is found in operation 308, then in operation 312 the authenticator attempts to find a sufficient match between the biometric information and the remaining profiles, i.e. those profiles in the set that were not associated with individuals likely to be in the area based on detected local mobile devices. If a match is found, then in operation 314, a signal is output indicating a low confidence match. The signal may include the identity associated with the matched profile in some cases. In some other cases, the signal may indicate a class or category of authorized persons to which the identified person belongs, e.g. a security clearance level. In some cases, the signal simply indicates a positive match with low confidence.

If no match is found, then a signal is output indicate the failure to identify the subject in operation 316.

In some implementations, the identification of a match may trigger a second factor authentication operation 318. In some embodiments, the second factor authentication operation 318 may only be triggered in the case of a low confidence match from operation 314, or may be triggered in the case of both a high and low confidence match. The second factor authentication may include any suitable authentication mechanism, including, for example, messaging a mobile device associated with the biometric profile with a code or other secret data that is to be input to the authenticator via a user interface to confirm the identification. The mobile device may be the same device associated with the user in the device-user associations, or may be a different device.

In some cases, the second factor authentication may include inputting a passcode, pressing a confirmation button or UI element, providing additional biometric information via a mobile device, executing a defined motion with the mobile device, etc.

After the second factor authentication occurs, the confidence level of the identification may be updated—e.g. increased, if successful—and a signal to that effect output in operation 320.

Figure 4:
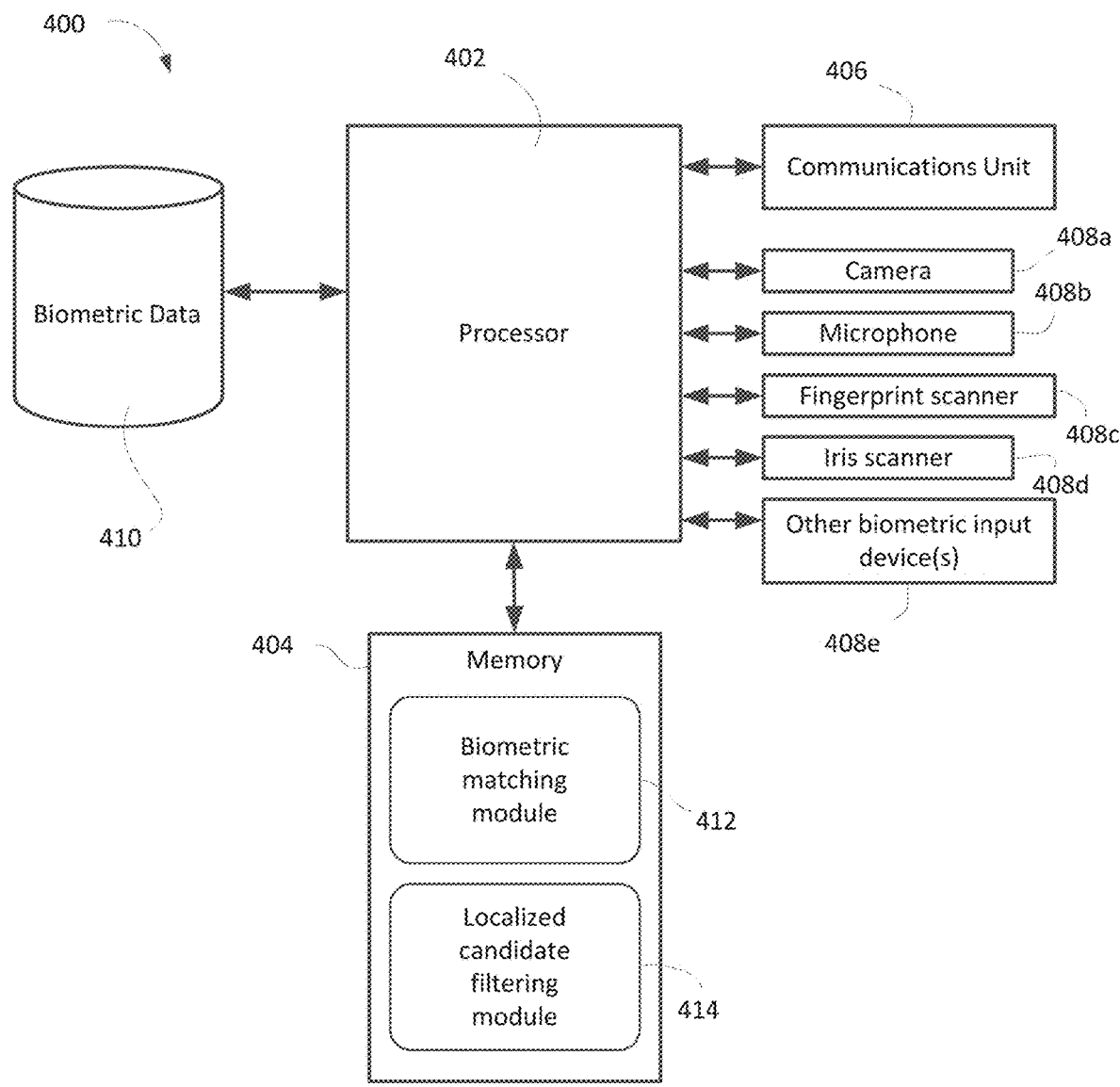
FIG. 4 shows in block diagram form, a simplified example of an authenticator.

Reference is now made to FIG. 4, which shows, in block diagram form, a simplified example of an authenticator 400. The authenticator 400 is an electronic device that includes a processor 402, memory 404, and one or more communication units 406 to enable wired and/or wireless communication with other systems or other parts of the electronic device. The processor 402 has access to a memory unit 410 storing biometric data, e.g. the database of biometric profiles. The memory unit 410 may be the same as memory 404 or may be separate. The memory unit 410 may be remoted located in some cases and accessed via the communication unit 406.

The authenticator 400 further includes one or more biometric input devices 408. Examples shown include a camera 408*a*, a microphone 408*b*, fingerprint sensor 408*c*, iris scanner 408*d*, or any other suitable biometric input device 408*e*. The biometric input devices 408 supply biometric information to the processor 402 obtained from a subject. In some instances, the biometric input devices 408 may be part of a physically separate device or system and may provide the biometric information via a communications connection, such as via the communications unit 406.

The memory 404 may store program instructions which, when executed by the processor 402, cause the processor 402 to carry out one or more of the operations described herein. The program instructions may include an operating system (not illustrated) enabling basic operations on the electronic device and providing a run-time environment within which applications may execute, as will be familiar to those of ordinary skill in the art.

In some implementations, the memory 404 may store a biometric matching module 412 containing executable program instructions that, when executed, cause the processor 402 to compare obtained biometric information to stored biometric profiles to determine whether a sufficient match is found. The biometric matching module 412 may output a signal indicating whether a match is found, indicating the identity of a matched profile, indicating a confidence level of a match and/or providing other information regarding the accuracy and reliability of match.

In some implementations, the memory 404 may store a localized candidate filtering module 414 containing executable program instructions that, when executed, cause the processor 402 to obtain information identifying persons likely to be in a defined geographic area associated with the biometric input device(s) 408 and based on mobile devices located in the defined geographic area, and to reduce the set of candidate biometric profiles to be searched by the biometric matching module 412 to a subset of candidate biometric profiles based on the information identifying persons. The subset selection may be implemented based on the intersection of the set of persons for whom biometric profiles are stored and the set of persons found in the information identifying persons likely to be located in the defined geographic area.

Figure 5:
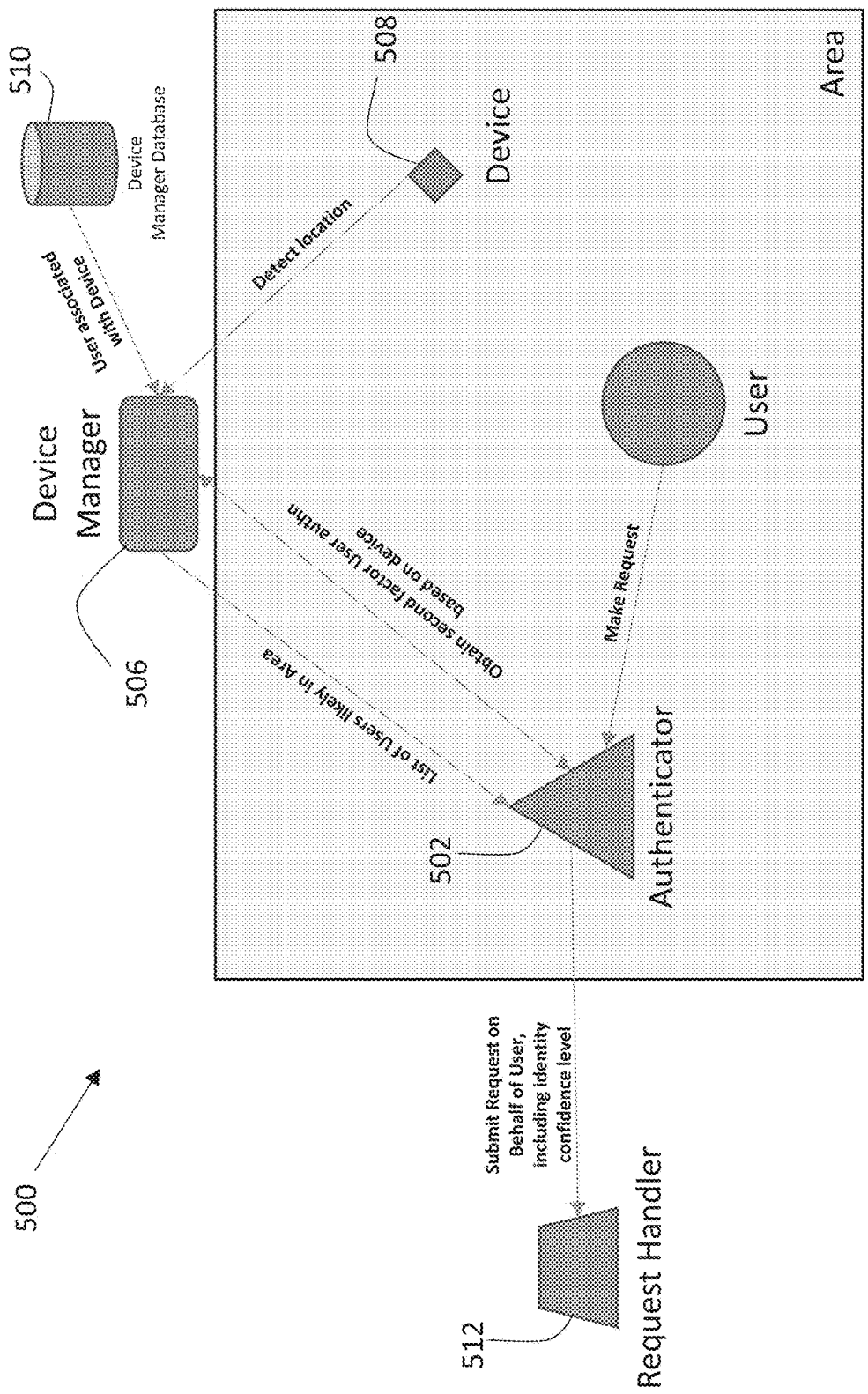
FIG. 5 diagrammatically illustrates a first use case.
Figure 6:
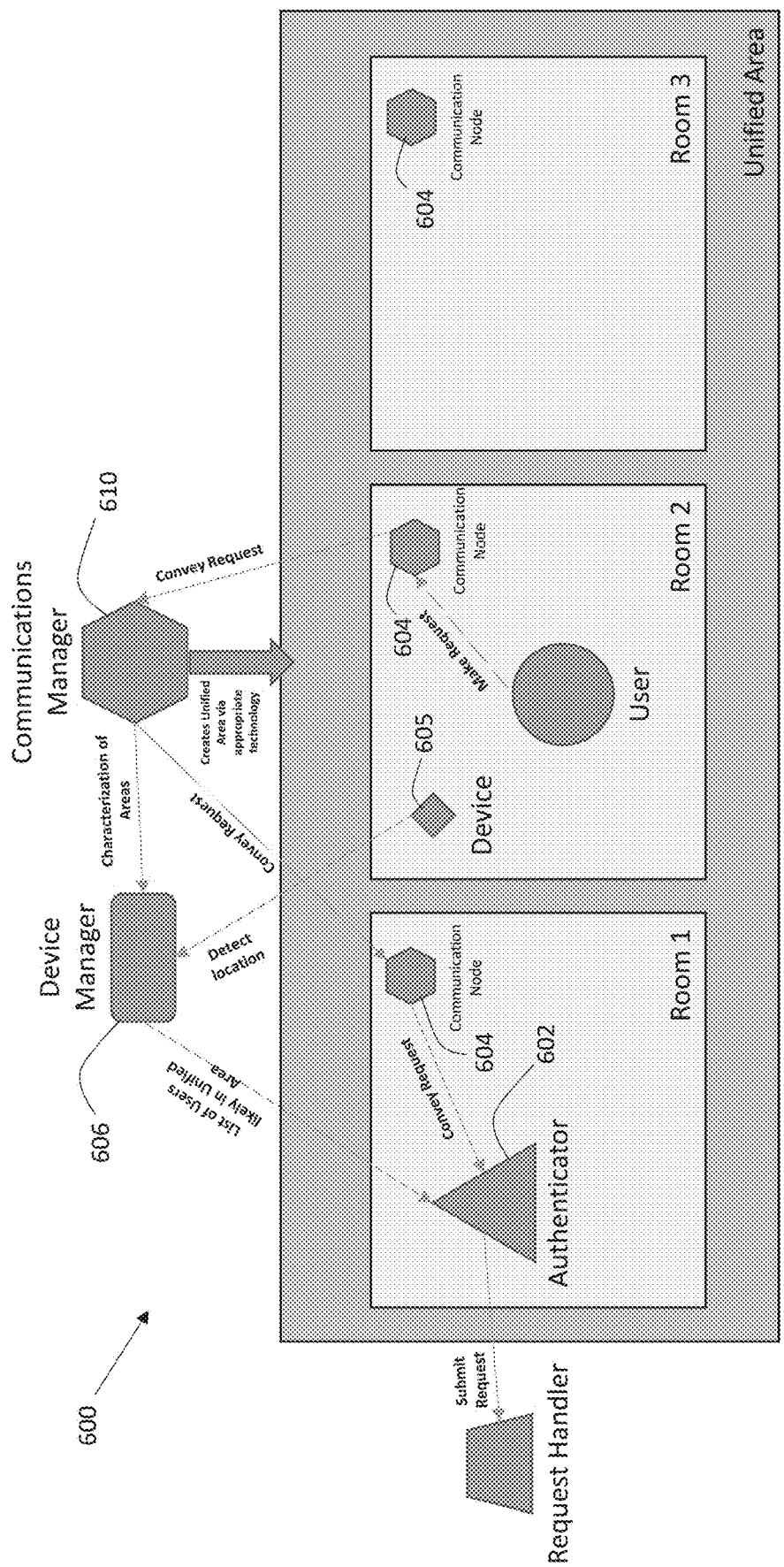
FIG. 6 diagrammatically illustrates a second use case.

Reference will now be made to FIGS. 5 and 6, which diagrammatically illustrate first and second uses cases 500 and 600, respectively, of an example biometric identification system.

In the first use case 500, illustrated in FIG. 5, an authenticator 502 receives, from a subject user, a request. The request include biometric information. The request may arrive via a user-activated input associated with a request, such a facility access request, a computing resource access request, or the like. The request come with biometric information or may cause the authenticator 502 to obtain biometric information via a biometric input device, such as a camera, microphone, or other sensor. The subject user is located within an area 504. In this example the authenticator 502 is also located within the area 504.

A device manager 506 is configured to track device locations. That is, the device manager 506 includes information regarding the location of devices and, specifically, identification information regarding devices 508 located within the area 504. The device manager 506 (or the authenticator 502) has, or has access to, a database 510 storing device-user associations. Accordingly, the device manager 506 provides the authenticator 502 with the set of users associated with devices 508 presently determined to be in the area 504. This may be provided periodically or in response to a specific request from the authenticator 502.

The authenticator 502 includes the stored biometric data for a plurality of users, i.e. their biometric profiles. Therefore, the authenticator 502 may select a subset of profiles based on the provided set of users associated with devices 508, and may attempt to match the obtained biometric information to one of the profiles in the subset. If no match is found, the authenticator 502 may attempt to match the biometric information to one of the other profiles.

A request handler 512 may be configured to carry out one of a number of operations in response to the user request, including granting access to a facility or computing resources, for example, dependent upon an output signal from the authenticator 502. The signal may indicate the confidence level of the identification, if any. In some cases, the request handler 512 may determine whether to seek further identification data if the confidence level is below a threshold. For example, if the identification is from the subset, the confidence level of the identification may be high, but if the identification is from the broader set after filing to match a profile in the subset, then the confidence level may be low. The authenticator 502 or the request handler 512 may seek additional identification authentication in the case of a low confidence identification. In some cases, the request handler 512 may provide restricted access or permissions to a user that is only identified with a low confidence level, and may provide less restricted access or permissions to a user that is identified at a high confidence level. A weakly identified user may be prompted to improve the level of access through providing additional identification information, such as through a second factor authentication process.

As an example, a request handler 512 may receive a request for access to specific data, e.g. current year's revenue figures for a company. That request is accompanied by biometric input to identify the requestor. Using the present system the authenticator may return an identification at a low confidence level, which may prompt the request handler to grant only limited access or a limited reply to the request, e.g. only a portion of the revenue figures, such as those already publicly disclosed, and not confidential current quarter figures.

The second use case 600 shown in FIG. 6 involves a distributed system in which an authenticator 602 and a subject user may not be located in the same area. The authenticator 502 may be capable of obtaining biometric information from a number of physically separate areas using one or more local biometric input devices. A communication manager 610 may link the separate areas through communications nodes 604 in the respective areas, thereby creating a unified area for some purposes. In some cases, the communications nodes 604 themselves may operate as biometric input devices, for example if the communication node 604 receives audio or video data in connection with voice print and/or facial recognition biometrics. In other cases, a separate local biometric input device (not shown) receives and relays the biometric input to the authenticator. In some cases, that biometric input data received by the local biometric input device may be relayed to the authenticator via the communications manager 610.

A plurality of devices is present in the unified area, such as example device 605, may be identified by device manager 606. As discussed above, the device manager 606 provides the authenticator with information regarding users likely in the unified area based on user-device associations and the devices identified in the unified area. In some implementations, rather than providing data regarding users in the unified area, the device manager 606 provide information regarding users likely to be in the specific sub-area from which the request originates and from which the biometric input was received.

One example of the second use case 600 involves a conference call between a number of participants in dispersed locations. During the call, a participant may make an audible voice request that is relayed via the communication manager 610 to all the other communication nodes 604, and that is received by the authenticator 602 located one of the other sub-areas. The authenticator 602 is then able to respond to the request by attempting to biometrically identify the requestor using voice print technology, for example. The device manager may provide identification of persons likely located in the unified area based on user-device associations to aid the authenticator 602.

It will be appreciated that the authenticator and any other electronic devices described herein may be implemented in a number of computing devices, including, without limitation, servers, suitably-programmed general purpose computers, and mobile devices. The described devices and system may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software component implementing the described method/process for biometric identification may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

What is claimed is:

1. A method of identifying a person located in a defined geographic area using an electronic device, the electronic device including at least one memory unit that includes stored biometric data for a set of people, the method comprising:
   obtaining biometric information from the person in the defined geographic area and information related to one or more devices located within the defined geographic area;
   obtaining, from a stored set of associations between people and devices, one or more identified people based on the information related to one or more devices located within the defined geographic area;
   reducing the set of people to a subset of people based on the one or more identified people;
   detecting a sufficient match between the biometric information and the stored biometric data associated with an individual from the set of people; and
   outputting a signal identifying said individual as the person and indicating a confidence level in the identification, the signal indicating a high confidence level when the person is from the subset of people and a low confidence level when the person is from the set of people but not from the subset of people.

2. The method claimed in claim 1, further comprising determining the devices that are located within the defined geographic area.

3. The method claimed in claim 2, wherein the determining the devices that are located within the defined geographic area is based on data from one or more local access points in a wireless network.

4. The method claimed in claim 1, wherein the stored set of associations includes a plurality of devices identifiers and, for each device identifier, one or more user identifiers.

5. The method claimed in claim 1, wherein reducing the set of people includes finding the subset as an intersection between the set of people and the one or more identified people.

6. The method claimed in claim 1, wherein the stored biometric data includes a biometric profile for each person in the set of people.

7. The method claimed in claim 1, wherein the biometric information includes one of a fingerprint scan, a facial image, an iris scan, a retinal scan, a palm pattern image, a vein pattern image, or a voice recording.

8. The method claimed in claim 1, further comprising granting reduced-access to the person in response to a request for access when the signal indicates the low confidence level.

9. The method of claim 1, further comprising requesting second factor authentication from said individual.

10. The method of claim 1, further comprising requesting second factor authentication from said individual when the signal indicates the low confidence level.

11. The method of claim 1, wherein the signal indicates a security clearance level of the person.

12. A system for identifying a person located in a defined geographic area, the system comprising:
   at least one memory unit that includes stored biometric data for a set of people; and
   an electronic system having:
      at least one biometric input device to obtain biometric information from the person in the defined geographic area,
      a communications unit to obtain information related to one or more devices located within the defined geographic area and to obtain, from a stored set of associations between people and devices, one or more identified people based on the information related to one or more devices located within the defined geographic area, and
      a processor to reduce the set of people to a subset of people based on the one or more identified people, detect a sufficient match between the biometric information and the stored biometric data associated with an individual from the set of people, and cause output of a signal identifying said individual as the person and indicating a confidence level in the identification, the signal indicating a high confidence level when the person is from the subset of people and a low confidence level when the person is from the set of people but not from the subset of people.

13. The system claimed in claim 12, further comprising a localized device detector to determine the devices that are located within the defined geographic area.

14. The system claimed in claim 13, wherein the localized device detector is to determine the devices that are located within the defined geographic area is based on data from one or more local access points in a wireless network.

15. The system claimed in claim 12, wherein the stored set of associations includes a plurality of devices identifiers and, for each device identifier, one or more user identifiers.

16. The system claimed in claim 12, wherein the processor is to reduce the set of people by finding the subset as an intersection between the set of people and the one or more identified people.

17. The system claimed in claim 12, wherein the stored biometric data includes a biometric profile for each person in the set of people.

18. The system claimed in claim 12, wherein the biometric information includes one of a fingerprint scan, a facial image, an iris scan, a retinal scan, a palm pattern image, a vein pattern image, or a voice recording.

19. The system claimed in claim 12, wherein the processor is to request second factor authentication from said individual.

20. The system claimed in claim 12, wherein the defined geographic area includes a union of two or more separate areas connected by a communications system, and wherein the processor is located in one of the two or more separate areas, and the person is located in another of the two or more separate areas.

21. The system of claim 12, wherein the processor is to request second factor authentication from said individual when the signal indicates the low confidence level.

22. The system of claim 12, wherein the signal indicates a security clearance level of the person.

* * * * *